United States Patent [19]

Shaw

[11] 4,012,670
[45] Mar. 15, 1977

[54] PROTECTING REINFORCED CONCRETE PIPE LINES FROM LIGHTNING DAMAGE

[75] Inventor: John A. Shaw, Sandton, South Africa

[73] Assignee: Interpace Corporation, Parsippany, N.J.

[22] Filed: May 12, 1975

[21] Appl. No.: 576,301

[52] U.S. Cl. .............................. 361/117; 174/47; 174/78; 361/215
[51] Int. Cl.² .......................................... H02H 3/22
[58] Field of Search .............. 317/61, 2 R, 9 R, 2 J; 174/47, 2, 37, 78; 138/96, 103, 109, 110; 61/72.1, 72.4; 339/13, 14 R, 22 R

[56] References Cited
UNITED STATES PATENTS

| | | | |
|---|---|---|---|
| 2,178,931 | 11/1939 | Crites et al. | 174/47 |
| 2,966,539 | 12/1960 | Sears et al. | 174/47 |
| 3,152,220 | 10/1964 | Gallacher | 174/78 X |
| 3,189,676 | 6/1965 | Muller | 317/2 J X |
| 3,217,092 | 11/1965 | Sakurada | 174/78 |
| 3,277,233 | 10/1966 | Houck et al. | 174/47 X |
| 3,457,359 | 7/1969 | Soucy | 317/2 J X |
| 3,749,814 | 7/1973 | Pratt | 174/47 |
| 3,783,178 | 1/1974 | Philibert et al. | 339/14 R X |

*Primary Examiner*—J D Miller
*Assistant Examiner*—Patrick R. Salce
*Attorney, Agent, or Firm*—Charles E. Baxley

[57] ABSTRACT

This disclosure teaches protecting from lightning damage a reinforced concrete pipe line. The pipe line generally comprises a plurality of pipe lengths each having a bell at one end and a spigot at the other end thereof. The bell of one pipe length receives the spigot of a next pipe length fitted therein. Each of the pipe lengths is provided with at least one longitudinal metallic reinforcing wire or rod having a bell end and a spigot end. The pipe line carries lightning electrical current along a relatively long portion thereof by means of an electrical lead joining the bell end of the reinforcing wire or rod of one pipe length to the spigot end of the reinforcing wire or rod of the next pipe length. By this expedient lightning electrical energy is dissipated into the earth through the relatively long portion of the pipe line.

3 Claims, 8 Drawing Figures

PROTECTING REINFORCED CONCRETE PIPE LINES FROM LIGHTNING DAMAGE

BACKGROUND OF INVENTION

In geographic areas of high lightning incidence and high soil resistivity, reinforced concrete pipes and more particularly prestressed concrete noncylinder pipes are subject to lightning damage. The present means for protecting such pipe lines is to use a Faraday cage which comprises a series of interconnected conductors which are parallel to and which also surround the pipe lengths. Such Faraday cages are expensive, they require considerable maintenance and they are of doubtful efficacy.

STATEMENT OF INVENTION

This invention protects reinforced concrete pipe lines (most particularly those of prestressed noncylinder pipe lengths) from lightning damage by enabling the pipe line to carry lightning current along a relatively long portion thereof whereby lightning energy is dissipated into the earth via the relatively long portion of the pipe line. Accordingly one object of this invention is to provide for dissipation of lightning electrical energy over a relatively long portion of the pipe line.

Electrical connection of longitudinal metallic reinforcing rods of one length of pipe to the next must be steadfast. To achieve such steadfast connection, a bell lead preferably connects the bell end of the reinforcing wire or rod of one pipe length to the metallic bell ring and a spigot lead preferably connects the metallic bell ring to the spigot end of the reinforcing wire or rod of the next pipe length. Accordingly another object of this invention is to assure positive electrical connection between at least one longitudinal metallic reinforcing wire or rod of one pipe length to at least one longitudinal metallic reinforcing wire or rod of the next pipe length.

Still another object of this invention is to use a metallic bell ring as an electrical conductor to assure electrical contact in the event of relative movement of mated bell and spigot pairs takes place.

Still another object of this invention is to confine the electrical conductors within the pipe joints.

Still another object of this invention is to avoid interference with sealing of the pipe joints.

Still another object of this invention is to provide method and apparatus which are simple and rapid to use, are relatively foolproof and which can be checked easily for proper application.

DESCRIPTION OF DRAWING

The foregoing and other objects, features and advantages will appear more fully from a detailed description of a preferred embodiment of this invention which follows and from claims which also follow, all viewed in conjunction with accompanying drawings wherein same numerals refer to like parts throughout and wherein:

DESCRIPTION OF PREFERRED EMBODIMENTS

Figure 2:
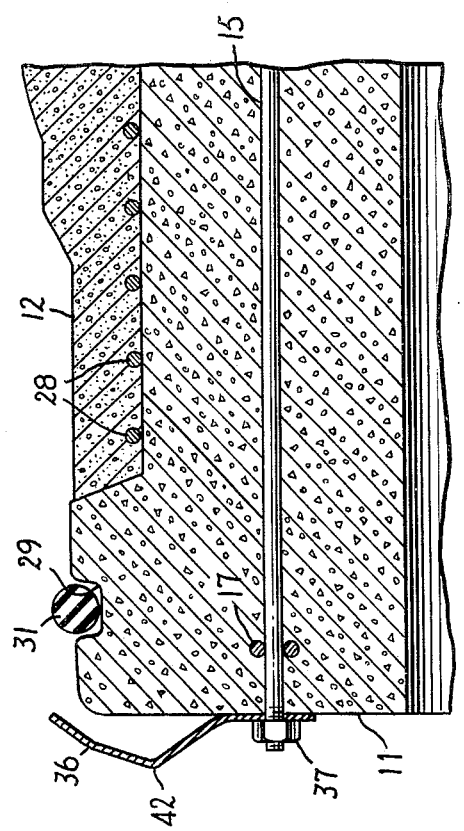
FIG. 2 is a broken partial vertical sectional view of a spigot end of a joint of a prestressed noncylinder concrete pipe.
Figure 1:
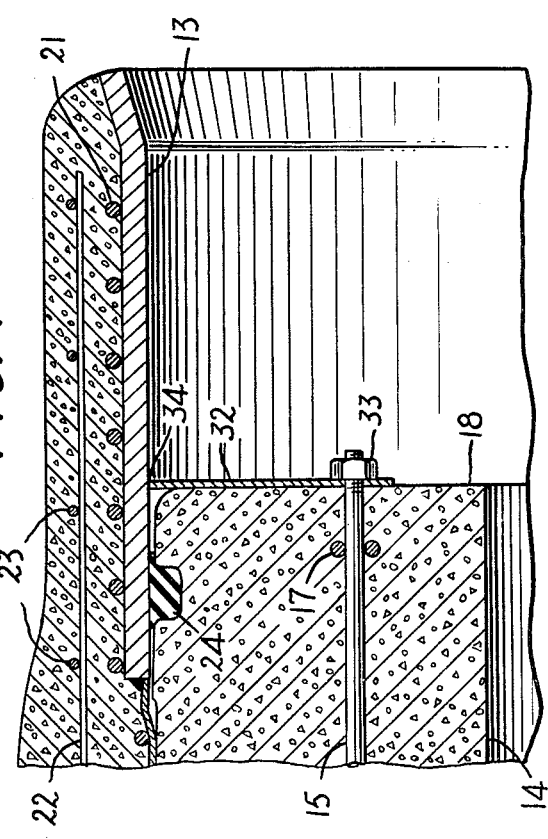
FIG. 1 is a broken partial vertical sectional view of a bell end of a joint of a prestressed noncylinder concrete pipe.
Figure 3:
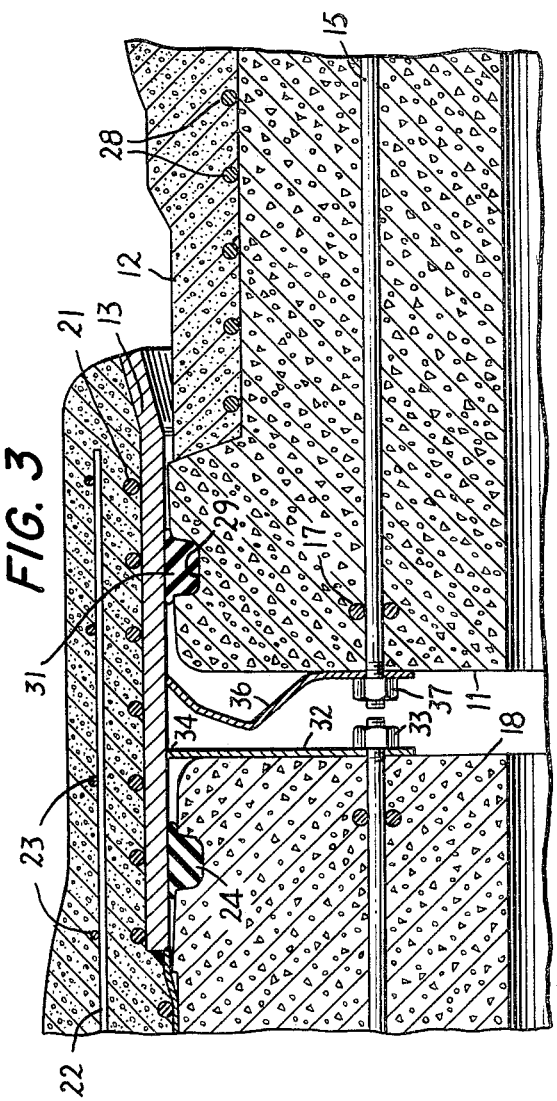
FIG. 3 is broken partial vertical sectional view showing the spigot of FIG. 2 engaged into the bell of FIG. 1.

In the usual practice of laying pipe lines (and more particularly those of prestressed noncylinder concrete pipe lengths as shown in FIGS. 1–3), pipe lengths are placed with a spigot 11 of one pipe length 12 fitted into a bell ring 13 of a preceding pipe length 14. Of particular interest to this disclosure are pipe lines that are on or above ground whereby they are exposed to lightning. The present disclosure is most pertinent where soils are highly resistive in which case dissipation of lightning electrical energy into the earth is inhibited.

The pipe lengths are seen in FIGS. 1–3 to be of prestressed concrete construction having longitudinally prestressed wires 15 spaced about their circumferences, and circumferential hoops 17. The bell end 18 shown best in FIG. 1 has a metallic bell ring 13 and bell prestressing wire 21 as well as other reinforcing fabric 22, 23. An O-ring 24 assists in sealing the bell ring 13. The spigot 11 shown best in FIG. 2 likewise has longitudinally prestressed wires 15 and circumferential hoops 17. The spigot 11 is provided also with spigot prestressing wire 28. In a well known manner the spigot 11 has a circumferential recess 29 into which another O-ring 31 is inserted and, on fitting of the spigot 11 into the bell ring 13, the O-ring 31 is compressed against the bell ring 13 to effect a watertight seal as best seen in FIG. 3. The joint may thereafter be protected further by well known means, such as grouting or the like, not shown here.

Figure 4:
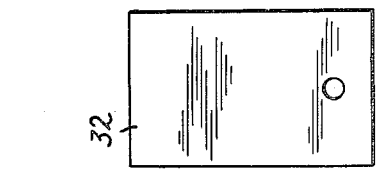
FIG. 4 is an end view showing a bell electrical lead for the bell end of FIG. 1.
Figure 5:
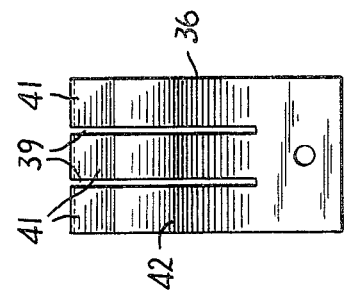
FIG. 5 is an end view showing a spigot electrical lead for the bell end of FIG. 2.

The crux of the present invention is to connect electrically the longitudinal prestressed wires 15 of the pipe length 14 to the longitudinal prestressed wires 15 of the next pipe length 12 and this can be accomplished by any electrical connection therebetween. In a preferred embodiment a bell lead 32 (shown in FIG. 4) is connected to at least one of the longitudinally prestressed wires 15 of the pipe length 14 by means of jam nuts 33 and are peened into jam contact with the bell ring at 34 as seen best in FIG. 1 and 3. Preferably three bell leads are employed and they are spaced circumferentially at 120° from each other. In the next pipe length 12, the prestressed wires 15 are connected to spigot leads 36 (seen in FIG. 5) by means of jam nuts 37 to extend radially outward therefrom. Again it is preferable that three spigot leads be employed and that they be arranged circumferentially at spacings of 120°. As seen in FIG. 5, the spigot leads 36 have grooves 38 which define bifurcations 41 and they are formed longitudinally as bow springs with bellwise longitudinal protruberances 42 so that on fitting of the spigot 11 into the bell ring 13 (as seen in FIG. 3) the bifurcations 41 of the spigot leads 36 fit snugly against the bell ring 13.

Figure 6:
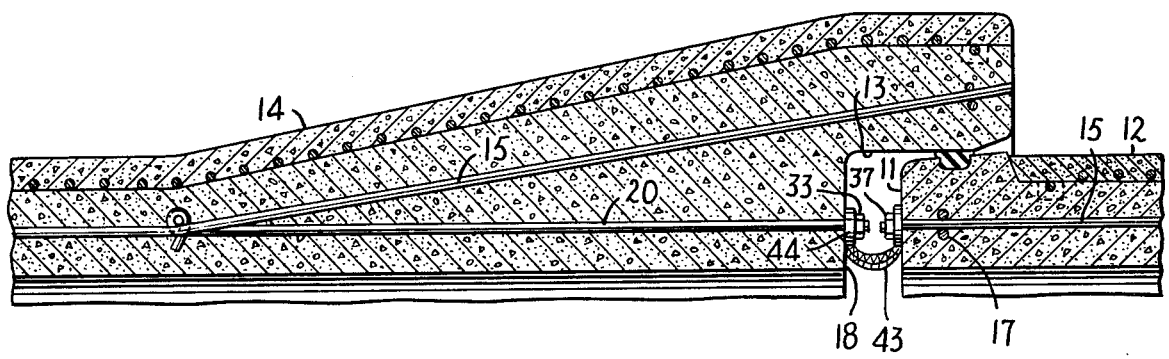
FIG. 6 is a broken partial vertical sectional view comparable to FIG. 3 showing another spigot engaged into a monolythic bell.
Figure 7:
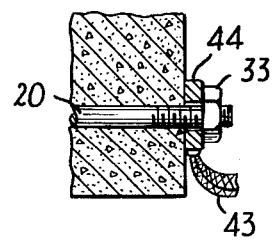
FIG. 7 is an enlarged broken detail view showing an electrical lead connected to a longitudinal reinforcing wire in the bell of FIG. 6.
Figure 8:
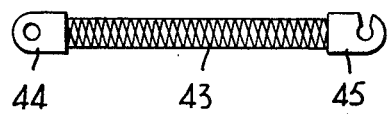
FIG. 8 shows the electrical lead of FIGS. 6 and 7.

In an embodiment of the invention shown in FIGS. 6–8 a spigot 11 of one pipe length 12 is fitted into a bell 13 of a preceding pipe length 14. Here again the pipe lengths are seen in FIG. 6 to be of prestressed concrete construction having longitudinally prestressed wires 15 spaced about their circumferences and circumferential hoops 17. The bell end 18 also has straight longitudinal nonprestressed wires 20. In this embodiment the straight longitudinal nonprestressed wires 20 of the pipe length 14 are connected electrically to the longitudinal prestressed wires 15 of the next pipe length 12 and this is accomplished by connecting a woven copper wire cable 43 therebetween by means of collars 44, 45 and jam nuts 33, 37.

It will be understood by those familiar with design manufacture and/or installation of reinforced concrete pipe lines that various deviations may be made from the shown preferred embodiment without departing from a main theme of invention as set forth in claims which follow.

I claim:

1. A reinforced concrete pipe line comprising in combination:

a plurality of pipe lengths each having a metallic bell ring at one end and a spigot at the other end thereof, the bell ring of one of the pipe lengths adapted to receive the spigot of a next of the pipe lengths fitted therein, each of the pipe lengths having at least one metallic reinforcing member extending from a bell end in the vicinity of its bell ring to a spigot end in the vicinity of its spigot, a bell electrical lead joining the bell end of the reinforcing member of one of the pipe lengths to the metallic bell ring thereof, a spigot electrical lead connected to the spigot end of the reinforcing member of a next of the pipe lengths, the spigot electrical lead engageable into contact with the bell ring by said fitting into said bell ring by said spigot, each of the pipe lengths having a plurality of the metallic reinforcing members spaced peripherally thereabout, each of the metallic reinforcing members having one of the bell electrical leads and one of the spigot electrical leads each extending radially outward therefrom, each of the spigot electrical leads formed as a bow spring for improved contact into the bell ring.

2. In a reinforced concrete pipe line exposed to lightning and having relatively low ability for dissipation thereof; with the pipe line comprising a plurality of pipe lengths each having a metallic bell ring at one end and a spigot at the other end thereof, with the bell ring of one of the pipe lengths adapted to receive the spigot of a next of the pipe lengths fitted therein, with each of the pipe lengths having at least one metallic reinforcing member extending from a bell end in the vicinity of its bell ring to a spigot end in the vicinity of its spigot; a method for protecting the pipe line from damage by the lightning and comprising steps as follows:

providing a bell electrical lead connecting the bell end of the reinforcing member of one of the pipe lengths to the metallic bell ring thereof, providing a spigot electrical lead connected to the spigot end of the reinforcing member of a next of the pipe lengths, engaging said spigot electrical lead to said bell ring.

3. In a reinforced concrete pipe line; comprising at least a first and a second pipe length, with the first pipe length having a metallic bell ring at one end thereof, with the bell ring adapted to receive a spigot of the second pipe length fitted therein, with the first pipe length having at least one metallic reinforcing member extending longitudinally therealong and terminating in a bell end in the vicinity of the bell ring, with the second pipe length having at least one metallic reinforcing member extending longitudinally therealong and terminating in a spigot end in the vicinity of the spigot; an improved joint for protecting the pipe line from lightning damage and comprising in combination:

a bell electrical lead connecting the bell end of the reinforcing member of the first pipe length to the metallic bell ring, a spigot electrical lead connected to the spigot end of the reinforcing member of the second pipe length, the spigot electrical lead engageable into contact with the bell ring by said fitting of said spigot into said bell ring, the first pipe length having a plurality of the metallic reinforcing members spaced peripherally thereabout, each of the metallic reinforcing members of the first pipe length having one of the bell electrical leads connected thereto and extending radially outwardly therefrom to engage the bell ring, the second pipe length having a plurality of the metallic reinforcing members spaced peripherally thereabout, each of the metallic reinforcing members of the second pipe length having one of the spigot electrical leads connected thereto and extending radially outwardly therefrom to engage the bell ring, each of the spigot electrical leads formed as a bow spring for improved contact into the bell ring.

* * * * *

UNITED STATES PATENT AND TRADEMARK OFFICE
CERTIFICATE OF CORRECTION

PATENT NO. : 4,012,670
DATED : March 15, 1977
INVENTOR(S) : John A. Shaw

It is certified that error appears in the above-identified patent and that said Letters Patent are hereby corrected as shown below:

Column 2, line 59, delete [38] and insert 39 therefor

Signed and Sealed this

Seventh Day of June 1977

[SEAL]

Attest:

RUTH C. MASON
*Attesting Officer*

C. MARSHALL DANN
*Commissioner of Patents and Trademarks*